United States Patent [19]

Benedetti et al.

[11] Patent Number: 4,745,271

[45] Date of Patent: May 17, 1988

[54] APPARATUSES FOR AUTOMATIC FOCUSING OF LENS SYSTEMS, IN PARTICULAR MICROSCOPES AND INSTRUMENTS FOR THE ELECTRONIC ACQUISITION OF MICROSCOPE IMAGES

[75] Inventors: Pier A. Benedetti, Livorno; Valtere Evangelista, Cascina, both of Italy

[73] Assignee: Consiglio Nazionale Delle Ricerche, Rome, Italy

[21] Appl. No.: 850,320

[22] Filed: Apr. 8, 1986

[51] Int. Cl.$^4$ .............................................. G01T 1/20
[52] U.S. Cl. .................................... 250/201; 250/204
[58] Field of Search ................. 250/201 PF, 204, 550; 354/404, 405

[56] References Cited

U.S. PATENT DOCUMENTS

| | | | |
|---|---|---|---|
| 3,450,018 | 6/1969 | John, Jr. | 354/404 |
| 3,538,334 | 11/1970 | Shaffer, Jr. | 250/201 PF |
| 3,917,409 | 11/1975 | Kaestner | 356/125 |
| 3,918,071 | 11/1975 | Albrecht | 354/25 |
| 3,941,996 | 3/1976 | Stauffer | 354/404 |
| 4,037,958 | 7/1977 | Schmidt et al. | 250/201 PF |

OTHER PUBLICATIONS

Molesini et al, "Focus-Wavelength Encoded Optical Profilometer", *Optics Communications*, vol. 49, No. 4, Mar. 15, 1984, pp. 229-233.

"Leitz Autofocus System (LAF)", *Leitz Information Bulletin* No. 002/Engl. (Semiconductor products, Information, Suggestions, Problem Solutions; Product Management, Instruments).

*Primary Examiner*—David C. Nelms
*Assistant Examiner*—Chung Seo
*Attorney, Agent, or Firm*—Browdy and Neimark

[57] ABSTRACT

An improved apparatus for automatic focusing of a lens system, including a space dissector (17) for analyzing the space frequency components of the image planes close to the ideal focus plane, and devices (53, 57) for detecting the position of the plane at which the maximum of space frequencies occurs, close to the ideal focus plane. An electronic device is provided for obtaining a suitable signal from said space dissector (17), to provide an adjustment control signal actuating a servo-control unit controlling the lens focusing, and for thus leading to the image plane having the maximum of high frequency components being placed in coincidence with the ideal focus plane.

12 Claims, 4 Drawing Sheets

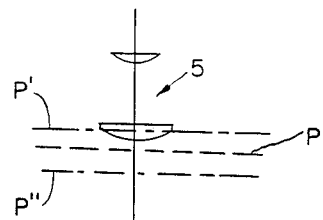
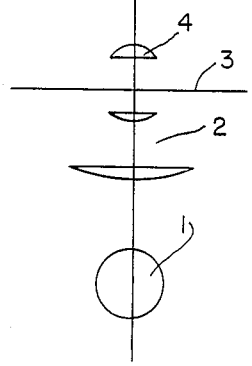
FIG. 1
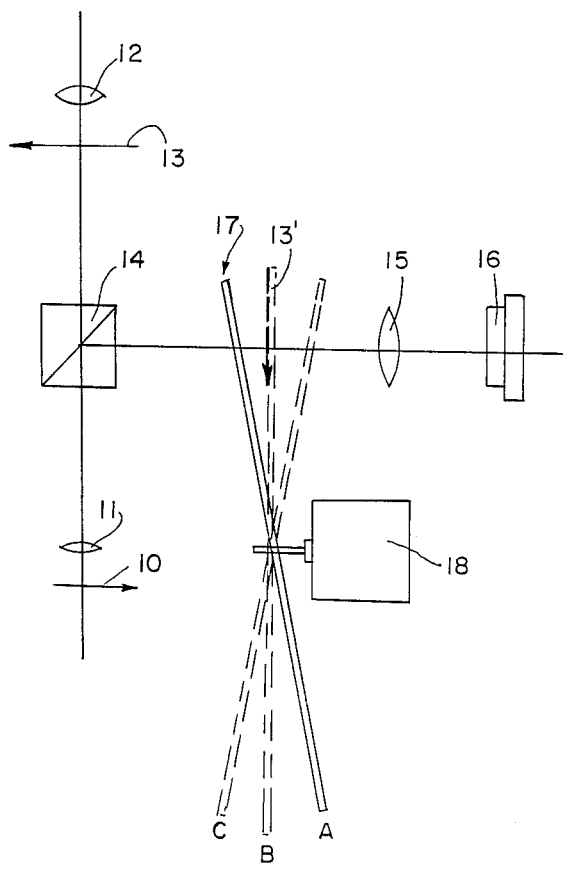
FIG. 2

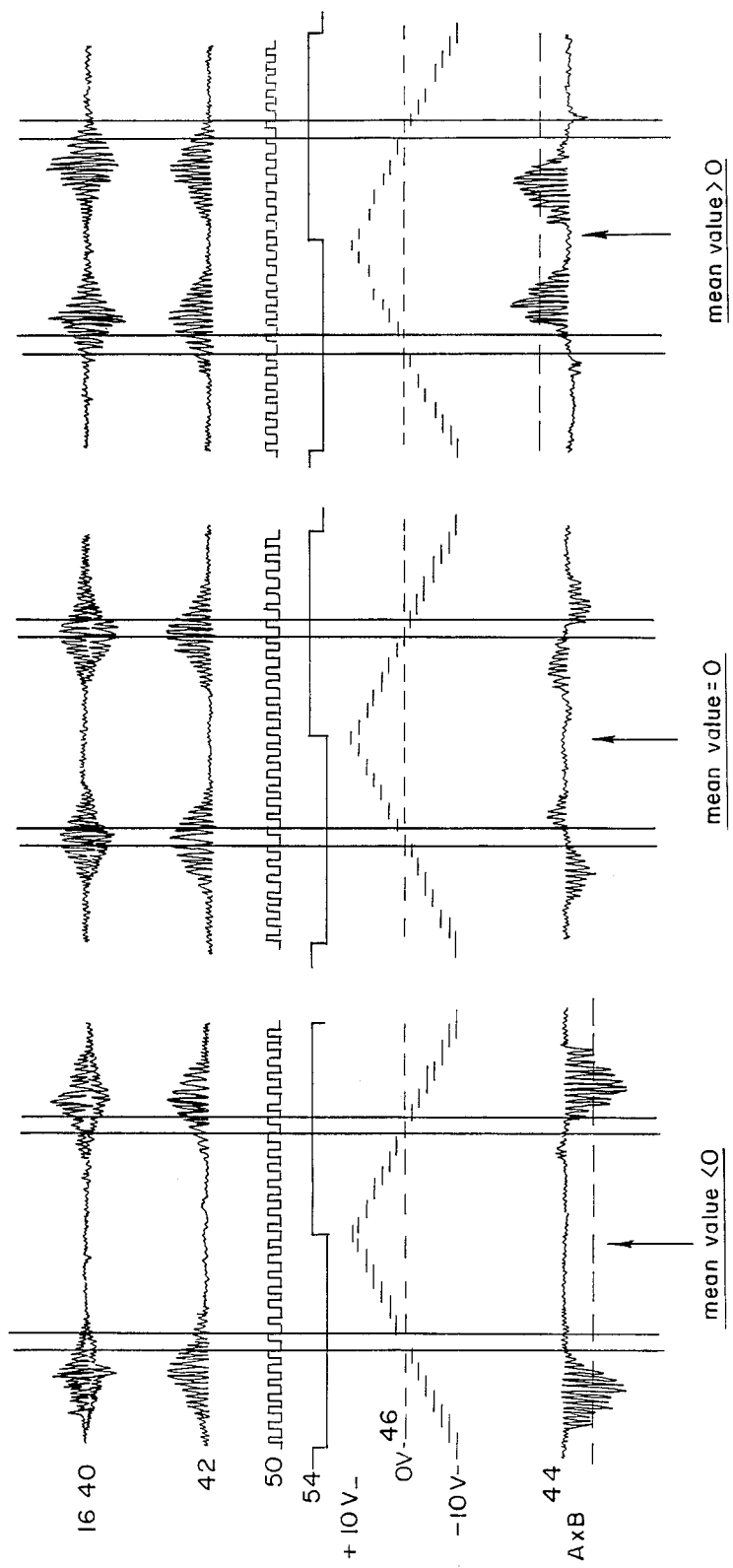

APPARATUSES FOR AUTOMATIC FOCUSING OF LENS SYSTEMS, IN PARTICULAR MICROSCOPES AND INSTRUMENTS FOR THE ELECTRONIC ACQUISITION OF MICROSCOPE IMAGES

The present invention relates to an improved apparatus for the automatic focusing of lens systems, such as microscopes and instruments for the electronic acquisition of microscope images.

The problem of lens systems focusing is known. Various techniques have been developed for the automatic focusing of lens systems such as cameras and microscopes. Although similar problems, from the conceptual point of view, are involved both in photographic apparatuses and in microscopes, the construction techniques for the automatic focusing systems are rather different in either case.

One of the general principles used for the automatic focusing of microscopes is to conduct an analysis of the space high frequences of the optical image close to the plane of the image itself. In practice, when an image is focused correctly, its contour and optical characteristics are more clear and therefore, carrying out an optical dissection at constant speed, frequency components of higher frequency are obtained when the image is in focus with respect to when the image is not in focus, i.e. when the real image is before or behind the image plane relevant to the optical instrument.

Various methods can be used to analyze the images formed on different planes and, therefore, their high space frequency content. For instance, it has been proposed to pick up the image by means of telecameras, or similar apparatuses, combined with more or less sophisticated electronic means for signal analysis, but the applicability of these systems is limited by high costs and/or poor operating flexibility. Other methods for the optical-mechanical dissection are described, but there is no evidence that these methods have been put into practice probably due to operating and conceptual faults.

In a field of the type of the present invention, it is particularly important to reach a real harmonization between the optical principles for the image dissection and the electronic principles followed in the circuit means for the signal elaboration and for the optical structures control in order to obtain the correct focus of the lens system.

Various apparatus for focusing of lens systems in general and in particular for microscopes are known in the art. By way of example, the Ernst Leitz Wetzlar GmbH report may be mentioned concerning the Leitz Autofocus System (LAF) applied to microscopes involving the use of a laser diode and means for detecting the distance error between the object plane of a microscope and the remaining portion of the optical structure.

U.S. Pat. No. 3,917,409 discloses an optical apparatus for determining focus comprising a pair of optical-mechanical modulators and photosensing means for detecting average lighting intensities and providing a focus adjusting signal. As a further example, U.S. Pat. No. 3,917,409 discloses an automatic lens focusing method and apparatus, wherein the focus adjustment for photographic apparatuses is obtained by analysing the high frequency components of the image. This system is suitable only for photographic apparatuses. Finally, the report appearing in "Optics Communications" Vol. 49, No. 4, of Mar. 15, 1984 can be mentioned concerning a focus-wavelength encoded optical profilometer. In this report there is described a profile measurement optical system working on the principle of focus multiplexing with space detectors operating on a wavelength basis using longitudinal dispersion optics.

Further examples of apparatuses working on the analysis of image frequency components could be mentioned, but there is no evidence that both the above-cited prior art disclosures and other examples known in the art are able to attain the same advantages of the apparatus according to the invention, that can be summarized as efficiency, low cost, and absence of substantial changes to the lens system of conventional microscopes. It has to be pointed out, finally, that, according to the above-cited prior art disclosures, it is necessary to move the focus position to find the optimum position.

According to the present invention there is provided an apparatus for the automatic focusing of lens systems, particularly microscopes and instruments for the electronic acquisition of microscope images comprising: means for analyzing space frequency components of the image close to the ideal focus plane; means for detecting the plane comprising the maximum of space frequencies close to said ideal focus plane; means for detecting the position of said plane comprising an image with a maximum of high space frequency components and for providing an adjustment signal applied to a servo-control capable of adjusting the focus of said microscope in such a way that said image plane comprising the maximum of high frequency components is brought into coincidence with said ideal focus plane.

The present invention will now be described with reference to various embodiments made for examplifying and non-limiting purposes and on the basis of the following drawings.

In the drawings:

FIG. 1 shows schematically the lens system of an optical microscope comprising the automatic focusing apparatus according to the invention;

FIG. 2 is the schematic diagram of the automatic focusing system according to the invention;

FIGS. 5a, 5b and 5c show wave shapes illustrating the operation of the apparatus according to the invention;

Figures 3, 4:
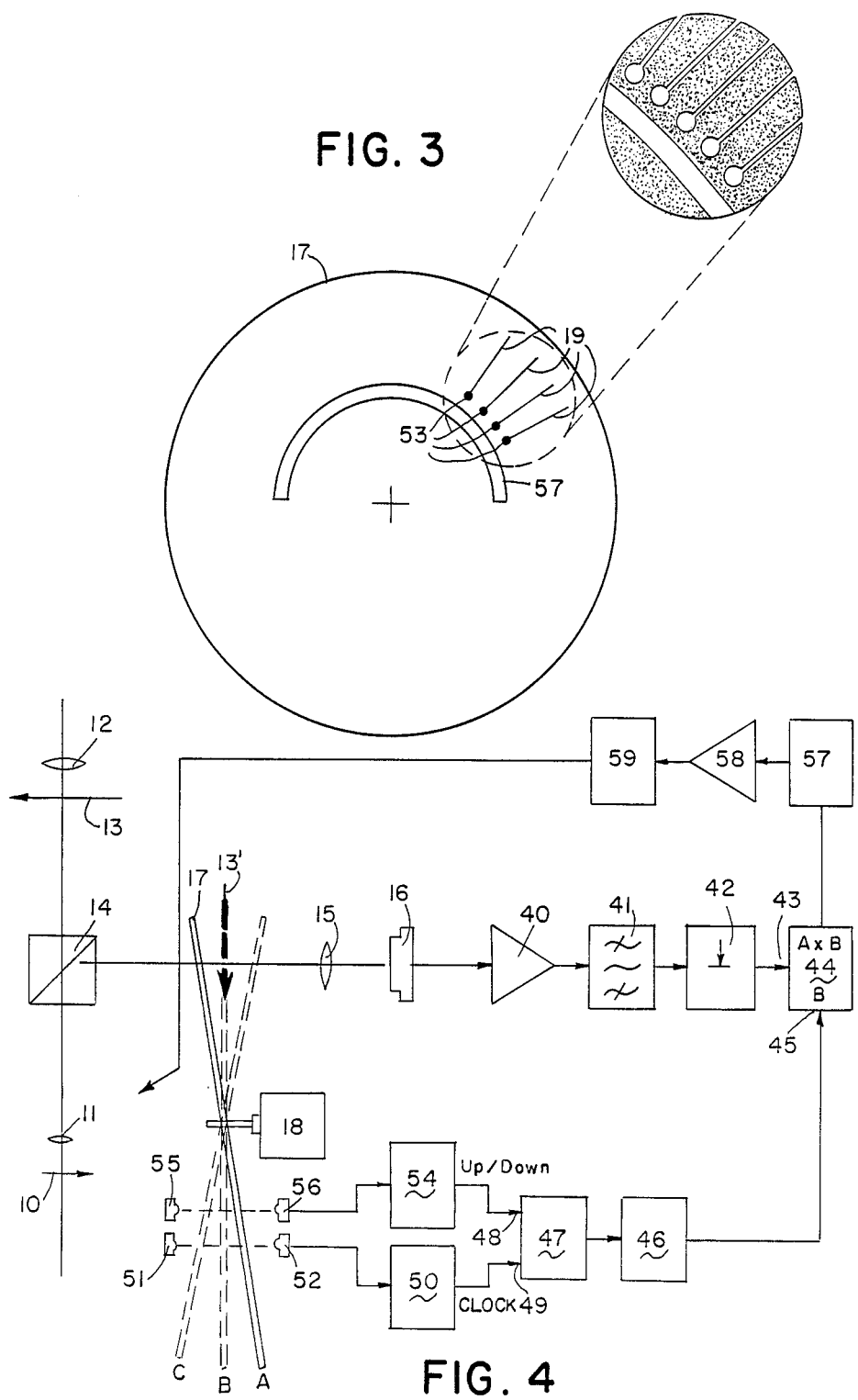
FIG. 3 is a detailed view of the optical dissector member as used with the system of the present invention in an actually preferred embodiment thereof.
FIG. 4 is a detailed block diagram of the automatic focusing apparatus according to the present invention.

With reference to the FIG. 1, a generic, compound-type microscope schematically comprises the assembly of the following units: a light beam generating unit 1 through a condensor 2 lights a preparation 3 on which the proper microscope, comprising a lens 4 and an eye-piece 5 when fit for visual operation, is focused. In the space comprised between lens 4 and eye-piece 5 there exists a plane P on which the enlarged image of preparation 3 is formed. According to the thickness and the characteristics of preparation 3, under the same optical conditions, the image will form generally close to plane P, for instance on a plane P' or P". If the image is not formed exactly on plane P, it will appear out of focus to the observer.

The focusing can be carried out either by varying the position (the height) of preparation 3, or varying the position of the lens and eye-piece assembly.

The focusing system according to the invention is designed to operate in the zone of the image plane P to provide an electrical control signal that, through a servo-motor, controls the position of the optical-mechanical structure so as to obtain a correct focusing.

With reference to FIG. 2, there is shown the simplified structure of a lens microscope comprising an object plane 10, a lens 11 and an eye-piece 12. The light beam going from the object 10 to the image 13 passes through a beam dividing prism 14, thereby a second image plane, indicated as 13', is obtained on a secondary optical axis. The light corresponding to the image plane 13' is picked up by a lens 15 in order to be focused on a photoelectric sensor 16. In correspondence of the image plane 13' there is arranged a space dissector comprising an opaque disc 17 rotating on a plane inclined with respect to the axis of rotation and provided with slits 19, said disc 17 being rotated by an electric motor 18. The disc 17 is mounted on a plane inclined with respect to its axis of rotation so as to cover with its motion the positions A, B and C, as shown in FIG. 2.

A plurality of slits or transparent zones 19, as shown in FIG. 3, arranged along an annulus, is provided peripherally on disc 17. Each slit 19 passes through the zone in which the image 13' forms at a distance greater or smaller, with respect to theoretical distance of the image plane, according to the instant angular position of disc 17. Assuming that the image forms anyway in focus in the space portion delimited by the extreme oscillations (A, C) of the rotating disc 17, at least a slit exists meeting with the correctly in-focus image. The signal coming out of sensor 16 contains the maximum of high frequencies when the $n^{th}$ slit passes in correspondence of the correct focusing zone. At this point it is possible to obtain an adjustment signal from the output of sensor 16, correlated to the angular position of disc 17, said signal controlling a servomotor to lead the image to the correct focusing plane, indicated at B, of the instrument.

The structure of the circuit means suitable to the above purpose is shown in FIG. 4, by way of example.

The same reference numbers as of FIG. 2 are used in FIG. 4.

The sensor output signal 16 is applied to a preamplifier 40, the output signal of which passes through a band-pass filter 41 sized to pass the prevailing frequency components when the focusing is close to the correct position. The output signal of the pass-band filter 41 is applied to a detector circuit 42, producing a rectified signal.

The output of the detector circuit 42 is applied to a first input 43 of an analog multiplier 44. At the other input 45 of said analog multiplier a step signal is fed, produced by the digital-analogic converter 46 providing a conversion into an analog form of the digital work present according to the counting steps of a multistep digital counter 47.

The digital counter 47 is a bidirectional type (UP-DOWN) counter having an "up-down" input 48 and a counting input 49. The counting input 49 is controlled by a pulse shaper circuit 50, that, in its turn, is controlled by the photoswitch comprising a light-emitter 51 and a photocell 52 arranged to "perceive" the marks 53 formed on disc 17 (see FIG. 3) in correspondence to the slits 19. The input 48 of counter 47 is controlled by a pulse shaper 54 controlled by a photoswitch comprising a light-emitter 55 and a photocell 56 arranged to "perceive" the sector 57 formed on disc 17 (see FIG. 3) indicating when a group of slits 19 is above or below the correctly focused image plane.

At this point the operation of the apparatus should be clear. Reference has to be made to FIGS. 5a, 5b and 5c where the three typical cases of under focus (FIG. 5a), in focus (FIG. 5b) and over focus (FIG. 5c) image are shown. The waveforms of the above FIGS. 5a, b, c are identified by their respective circuit means. It is immediately apparent from these wave-forms that a well defined signal is obtained according to the various focus conditions and, more precisely, a signal with average value below zero in case of below-focus image, a signal with average value equal to zero in case of in-focus images and a signal with average value above zero in case of an above-focus image.

Coming now back to FIG. 4, the signal from the analog multiplier 44 is applied to a feedback signal conditioning filter 57, according to the teachings of the automatic control technique, which is applied to a power amplifier 58 controlling a servo-motor 59 actuating the microscope focusing system (object plane height, draft position and so on according to the basic structure of the particular microscope involved).

Various modifications the above described embodiment can be devised. For instance, in the place of marks 53 and sector 57, disc 18 could be provided with an encoder of the absolute type to obtain, according to conventional technique, a signal corresponding to the wave-form of FIG. 5a, 5b, 5c. Furthermore, a possible modification can be made to the disc 17 itself that could be realized in the form of an helix, thus increasing the spatial resolution, the number of slits being equal.

The above described system has, however, the inconvenience that, in case of an image having a structure feature leading to a geometry substantially orthogonal to the slits, operating problems intrinsically arise, because the high frequency components would be missing.

Figure 6:
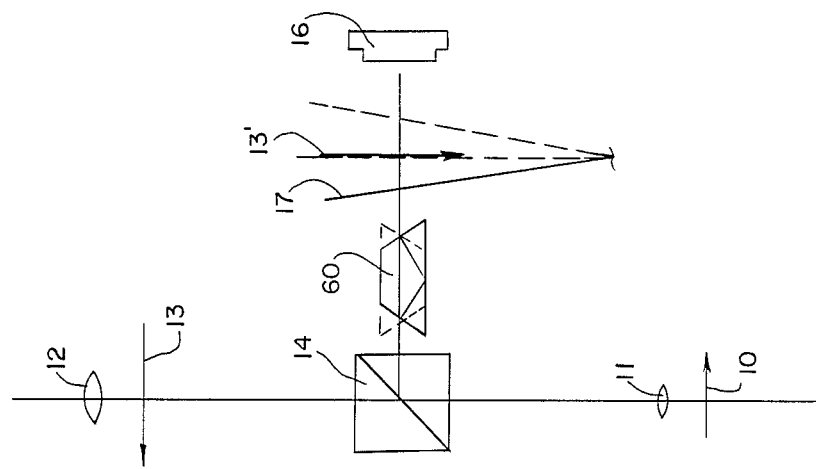
FIG. 6 shows a first variation of the apparatus according to the invention.

This inconvenience can be overcome by interposing, between the microscope lens and the dissector disc 17, an Amici prism 60 (see FIG. 6), rotating at a rotation speed substantially lower than that of the dissector disc 17.

As is known, an image transmitted by an Amici prism is rotated of an angle that is double the rotation angle of the prism itself about its main axis. Therefore, assuming that the Amici prism 60 is rotated about its axis, for instance by means of gears, at a speed lower than that of the disc 17, the signal coming out of sensor 16, will anyway include high frequency components usable for controlling the above described focusing servo-system irrespective of the type of image.

Figure 7:
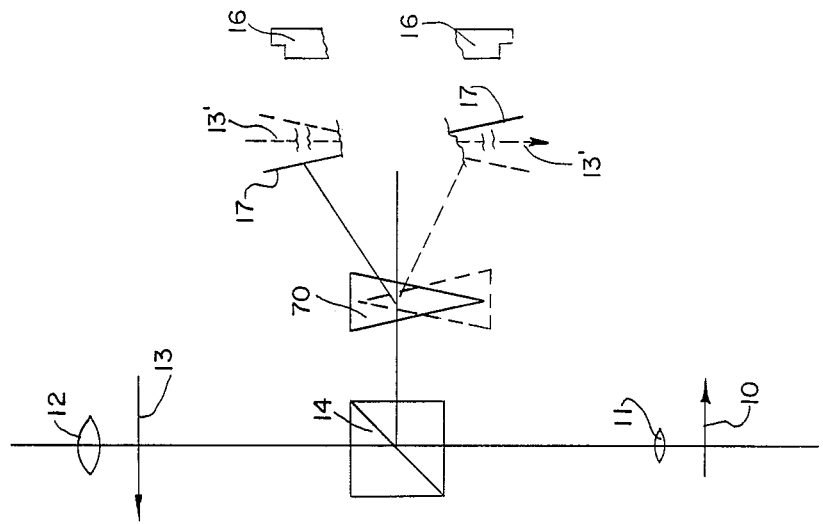
FIG. 7 shows a second variation of the apparatus according to the invention.

According to another variation, the same advantage can be obtained by means of a deflecting prism 70 (see FIG. 7) interposed in the optical path between the lens and the sensor 16. As a consequence of the rotation of the deflecting prism 70, the image rotates along a circumferences proportional to its deflection coefficient. As is known, the image does not rotate, but the orbital path of the same is equivalent to a rotation about itself when reference is made to the slits geometry. In such a case, the axis of rotation of the dissecting disc 17 will coincide with the optical axis of the microscope, and sensor 16 will have to be of the large area type in order to be effective on the whole circle crown covered by the image.

We claim:

1. An apparatus for automatic focusing of lens systems, in particular microscopes and instruments for the electronic acquisition of microscope images, comprising:
   means for analyzing space frequency components along any direction in an image of said lens system close to an ideal focus plane thereof, comprising a rotating disc with radial slits evenly distributed therein for passing respective parts of each said image;
   means for detecting a plane comprising the image having the maximum of said space frequencies close to said ideal focus plane;
   means for detecting the position of said image plane having said maximum of high space frequency components and providing a corresponding adjustment signal applied to a servocontrol capable of adjusting the focus of said lens system, in such a way that said image plane having said maximum of high frequency components is brought into coincidence with said ideal focus plane.

2. An apparatus according to claim 1, wherein said rotating disc is arranged for being moved in a substantially perpendicular direction with respect as to the optical axis of the system and in such a way to progressively pass through said optical axis before, in correspondence with, and behind said ideal focus plane, said analyzing means cooperating with a photodetector fit for providing an electric signal corresponding to the light variations caused by the image details of the object.

3. An apparatus according to claim 2 wherein said rotating disc is constituted by an opaque disc with said slits therein rotating on a plane not perpendicular to the rotation axis and with said slits formed at equal circumferential distances.

4. An apparatus according to claim 3 wherein said slits are associated with marks provided on said opaque disc, and photoelectric means are provided for providing an instant indication of the position of the slits on said opaque disc that instantaneously pass through said different image planes along the optical axis.

5. An apparatus according to claim 3 wherein a sector zone is provided on said opaque disc, extending substantially for a semi circumference thereon, and and arranged to detect which group of slits is either above or below said ideal focus plane.

6. An apparatus according to claim 2, wherein an output of said photo-detector for providing an electric signal corresponding to the light variations caused by the image details of the object is connected to a band-limited amplifier suitable for passing the higher frequency components, wherein marks and a sector zone on said member with said slits and associated respectively with electronic means which are also provided for obtaining a step signal electrically representing the position of the slits in front of, in correspondence with or behind said ideal focus plane and for providing an error signal that, applied to a servocontrol of the conventional type that is further provided, controls a lens system focus mechanism also provided, in such a way as to put at zero the error and therefore to bring the focus plane in coincidence with the ideal focus plane.

7. An apparatus according to claim 1 wherein said means for analyzing space frequency components of the image on a plane close to the ideal focus plane are arranged on a secondary optical axis of the lens system, said secondary optical axis being obtained by a beam dividing means.

8. An apparatus according to claim 6 wherein said electronic means for producing a step signal electrically representing the position of said slits in front of, in coincidence with, and behind said ideal focus plane comprises electronic counter means controlled by the signal obtained by said marks, said electronic counter being of the "up-down" type, wherein the up-down control signal is obtained from a signal produced by said sector, said counter means cooperating with digital-analogic converter, the exit end of which is applied to a first inlet of an analogic multiplier, to a second inlet of said analogic multiplier being applied a rectified signal representing said high frequency components, the output signal of said multiplier constituting the control signal for a servocontrol for actuating the focusing devices of the lens system.

9. An apparatus according the claim 1 wherein said lens system is an optical type, compound microscope, the electronic acquisition of microscope images.

10. An apparatus according to claim 1 wherein said means comprises a lens system for rotating the image during said analysis of the high space frequency components, said lens system comprising an Amici prism.

11. An apparatus according to claim 1, wherein said analyzing means comprises a deflecting prism in the shape of a wedge for generating an orbital motion of said image during said analysis of the high space frequency components.

12. Apparatus according to claim 1, wherein said lens system is an instrument for the electronic acquisition of microscope images.

* * * * *